Jan. 11, 1944.  L. F. MORONEY  2,339,232
BRAKING AND LOCKING MECHANISM
Filed March 5, 1941
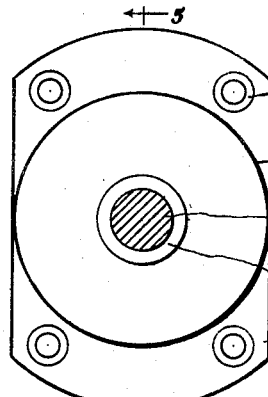
Fig.1.
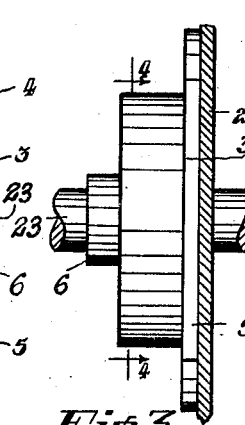
Fig.3.
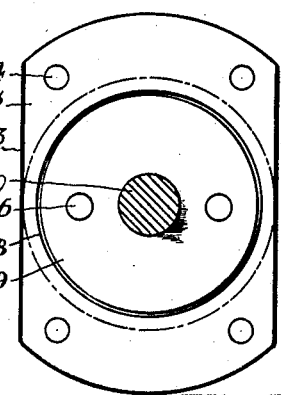
Fig.2.
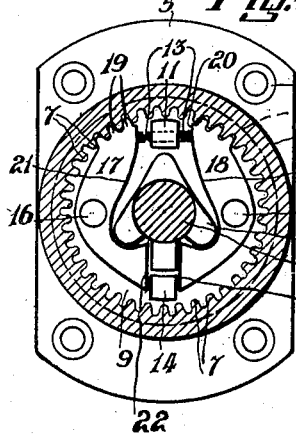
Fig.4.
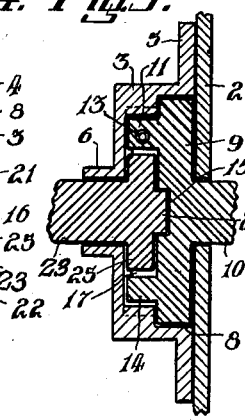
Fig.5.
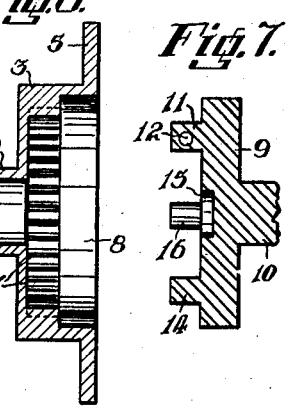
Fig.6.
Fig.7.
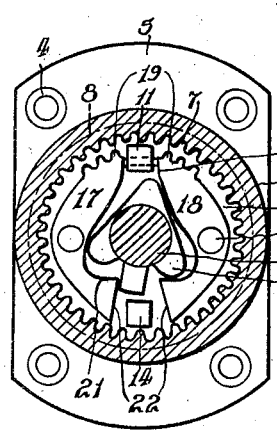
Fig.8.
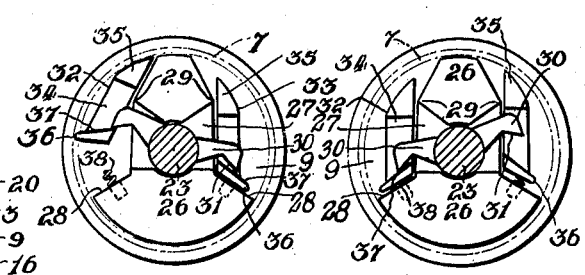
Fig.9.  Fig.10.
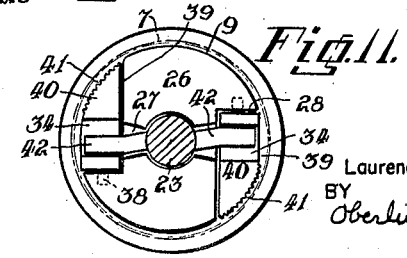
Fig.11.
INVENTOR
Laurence Francis Moroney
BY
Oberlin, Limbach & Day
ATTORNEYS Patented Jan. 11, 1944

2,339,232

UNITED STATES PATENT OFFICE 2,339,232

BRAKING AND LOCKING MECHANISM

Laurence Francis Moroney, Moonee Ponds, near Melbourne, Victoria, Australia

Application March 5, 1941, Serial No. 381,865
In Australia March 8, 1940

5 Claims. (Cl. 192—8)

This invention relates to improved mechanism adaptable for braking aand locking purposes with power transmission gearing, self-starter mechanism of motor vehicles, clutch mechanisms, winding and hauling gear, and locking systems inclusive of those provided for sliding windows and like elements.

The principal object of the invention is to provide a braking and locking mechanism which is of compact and durable construction, is positive and efficient in operation, and is adapted for economic production by die-casting or other mass production methods.

When the invention is applied as a braking and/or locking system to a shaft and is required to operate in both directions of rotation, the shaft is formed in two co-axially aligned parts hereinafter termed the driving shaft and the driven shaft. The mechanism comprises a cylindrical casing having means whereby it is secured concentrically about the adjacent ends of said shafts. Fixed on the driven shaft is a rotor revoluble within the casing and having detents engageable with the inner surface of the casing. An abutment member is formed on the rotor, and a cam or lever is fixed on the driving shaft. The components are so designed and arranged that when rotary motion is imparted to the driving shaft in either direction, the cam or lever actuates the detents so as to release them from engagement with the casing and makes a driving connection through one or both of said detents with an abutment member on the rotor whereby the driving shaft and the driven shaft are rotated unisonally. Upon cessation of the motion of the driving shaft, the detents are automatically returned from their released positions into locking engagement with the inner surface of the casing.

In order that the invention will be clearly understood reference is made to the accompanying drawing wherein:

Figs. 1, 2 and 3 are views in front elevation, in rear elevation and in side elevation, respectively, illustrating a representative form of the improved mechanism.

Fig. 4 is a section on the line 4—4 in Fig. 3 showing the locking pawls of the rotor in engagement with the casing.

Fig. 5 is a section on the line 5—5 in Fig. 1.

Fig. 6 is a vertical section of the casing of the mechanism.

Fig. 7 is a vertical section of the rotor.

Fig. 8 is a section similar to Fig. 4, but illustrating the pawls released from the casing.

Figs. 9 and 10 are front elevational views of a modified form of the mechanism and wherein the locking pawls are shown in engaged and in disengaged positions.

Fig. 11 is a front elevational view illustrating another modified form of the mechanism.

Referring initially to Figs. 1 to 8 of this drawing, 2 indicates a mounting plate to which a casing 3 is secured by bolts passed through countersunk holes 4 in an attachment flange 5 of said casing. The casing has in a central position a bearing boss 6 and it is provided on its inner surface with circumferential serrations or teeth 7 and a smooth internal bearing surface 8 of greater diameter than that of the serrated or toothed portion.

A rotor 9 is fixed on the inner end of a driven shaft 10 and is revoluble within the smooth portion 8 of the casing. The rotor has on its inner surface an abutment 11, which is apertured at 12 to accommodate a helical compression spring 13, and in a diametrically opposite position on the rotor is a second abutment 14. An axial recess 15 is formed on the inner surface of the rotor which has two pivot studs 16, the line of centres of which studs intersects at right angles the diametral line between said abutments 11 and 14.

Pivoted on the studs 16 are pawls 17 and 18 each of which has on its outer side teeth 19 adapted for engagement with the serrations or teeth 7 formed on the inner surface of the casing 3. Each pawl has its inner side shaped to provide a flat bearing surface 20 for an end of the compression spring 13, a curved cam surface 21 for the purpose to be hereinafter explained, and a flat surface 22 to impinge against the abutment 14 of the rotor.

Journaled in the bearing boss 6 of the casing 3 in co-axial alignment with the driven shaft 10 is the driving shaft 23 which has its inner end 24 of reduced diameter and seated in the axial recess 15 of the rotor. Rigidly fitted on, or formed integrally with, the driving shaft is a cam 25 which is contoured to fit closely between the cam surfaces 21 of the pawls 17 and 18 as is seen in Fig. 4. The cam 25 is inoperative when no rotational force is exerted on it relative to the rotor 9. Consequently, the spring 13 which presses against the flat surfaces 20 of the pawls 17 and 18 forces the teeth 19 of said pawls into engagement with the serrations or teeth 7 of the casing 3 whereby the rotor is locked against rotational movement relative to said casing as is shown in Fig. 4.

When the driving shaft 23 with the cam 25 are initially rotated in clockwise direction, the cam acting simultaneously upon the curved surfaces 21 of the pawls 17 and 18 imparts pivotal movement to said pawls about the studs 16 against the pressure of the spring 13 and withdraws the teeth 19 of said pawls from locking engagement with the casing teeth or serrations 7 as shown in Fig. 8. Upon continued rotation of the driving shaft, the cam 25 acting through the pawls 17 and 18, the studs 16 and the abutment 11 exerts rotational force upon the rotor 9. When rotational force exerted on the rotor ceases, the spring 13 pressing outwardly upon the flat surfaces 20 of the pawls imparts pivotal movement to said pawls whereby their teeth 19 are forced into engagement with the internal serrations or teeth 7 of the casing 3 as shown in Fig. 4. Should rotational force be then applied to the driven shaft 10 in an attempt to turn the rotor 9 in clockwise direction against the action of the lock, the force that is exerted by said rotor through the pivot 16 of the pawl 17 forces the teeth 19 of that pawl more firmly into locking engagement with the serrations or teeth 7.

When the driving shaft 23 is rotated in anti-clockwise direction to rotate the driven shaft 10 in corresponding direction, the cam 25 acts simultaneously upon the curved surfaces of the pawls 17 and 18 causing said pawls to pivot about the studs 16 against the pressure of the spring 13 and withdraw the teeth 19 from locking engagement with the casing serrations or teeth 7 whereupon the rotor 9 is free to rotate in anti-clockwise direction. Upon the continued rotation of the driving shaft in anti-clockwise direction, the cam 25 acting through the pawls 18 and 17, the studs 16 and the abutment 14 exerts rotational force in anti-clockwise direction on the rotor 9 and thus rotates the driven shaft 10. Upon cessation of this driving force, the teeth 19 of the pawls are immediately forced into locking engagement with the casing serrations or teeth 7 by action of the spring 13. Any endeavour which may then be made to further turn the rotor in anti-clockwise direction will merely cause the teeth 19 of the pawl 18 to more firmly engage the casing serrations or teeth.

The modification which is shown in Figs. 9 and 10 is particularly adapted for locking systems. The rotor 9 is formed with an embossment 26 on its inner surface which is recessed centrally at 27 and has two oppositely disposed shoulders 28 and the angular shoulders 29. The driving shaft 23 has its inner end seated within the recessed portion 27, and it has two rigidly fixed arms 30, each having at its outer end a wedging member 31. Two detents 32 and 33 are positioned on opposite sides of the rotor embossment, and they are recessed at 34 to the same degree as the said recess 27 to accommodate the outer ends of the arms 30. The detents 32 and 33 are each formed having at its forward end a curved wedge part 35 and at its rear end a tooth 36 and a wedge face 37 to co-act with the wedge member 31 of the relative arm 30. Helical compression springs 38 are housed in holes provided in the shoulders 28. The rotor 9 with the detents 32—33 and arms 30 is rotatably housed within a casing 3 constructed as hereinbefore described and as illustrated particularly in Fig. 6.

When rotary motion in anti-clockwise direction is initially imparted to the driving shaft 23, the wedge 31 acts on the wedge face 37 of the detent 32. This action combined with the rearward pressure that is exerted by the relative arm 30 on the detent 32 causes the withdrawal of the latter from engagement with the casing serrations 7. Upon continued rotation of the driving shaft, the pressure exerted by the arms 30 against the walls of the embossment recess 27 causes the rotor 9 to rotate within the casing 3, the detent 32 being held inoperative by an arm 30 and the other detent 33 being free to follow the rotor in its rotary movement. Upon cessation of rotary movement of the driving shaft, the springs 38 immediately force the detents 32 and 33 outwardly so that their wedge parts 35 engage the casing serrations 7. If an attempt should now be made to further turn the rotor in anti-clockwise direction, an angular shoulder 29 of the rotor embossment 26 will press upon the detent 32, causing it to pivot about its forward end and thereby force the tooth 36 into secure locking engagement with the casing serrations. At the same time, the pressure of the embossment 26 of the rotor upon the wedge part 35 will prevent slip or displacement of the tooth 36 of the detent 32. Should an attempt be made to turn the rotor in clockwise direction, the detent 33 will be similarly actuated so that its tooth 36 is forced into locking engagement with the casing serrations.

The modified construction illustrated by Fig. 11 provides a braking or locking system which will permit rotation of a driven shaft in one direction and prevent its rotation in the opposite direction. In this form of my invention, the rotor 9 rigidly fitted on the driven shaft 10 has on its inner surface an embossment 26 which is substantially circular in shape but has two peripheral right-angled recesses 39 providing shoulders 28. Each of said recesses 39 accommodates a wedge 40 of approximately semi-segmental shape having serrations 41 on its outer face and acted upon by a helical compression spring 38 that is fitted into a socket formed in the relative shoulder 28. A recess 27 is formed diametrically across the rotor embossment 26, and the faces of the wedges 40 are correspondingly recessed at 34.

Secured to the driving shaft 23 is a lever 42 which is fitted within the recess 27 of the rotor embossment 26 and is capable of slight rotational movement relative to said rotor. The opposite ends of the lever 42 engage the recesses 34 formed in the faces of the wedges 40. The rotor 9 with the wedges 40 and the lever 42 are rotatably housed within a casing 3 of construction similar to that illustrated in Fig. 6, except that serrations are formed circumferentially on the inner surface of said casing in lieu of the teeth which are illustrated in that view.

Upon rotation of the driving shaft 23 in anti-clockwise direction, the lever 42 acts upon the wedges 40 to press them against the shoulders 28 and thus withdraws both of said wedges from engagement with the casing serrations 7 to thereby permit rotation of the rotor. Upon cessation of rotary movement of the driving shaft, the wedges are forced outwardly by their springs 38 into engagement with the casing serrations to thereby prevent rotation of the driven shaft in anti-clockwise direction. The driven shaft, however, is free to rotate freely in clockwise direction owing to the pressure exerted upon the wedges 40 by the rotor being applied at the back of said wedges by the shoulders 28 and not at the wedge points as would be the case if an attempt were made to force the rotor in anti-clockwise direction. The shoulders 28 pressing upon said wedges cause them to slip and follow the rotor in its rotary movement.

What I do claim is:

1. An improved braking and locking mechanism for the purposes specified comprising a driving shaft, a cylindrical casing provided with means for securing it co-axially about said shaft, a rotor co-axially and rotatably mounted within said casing, a wedge accommodated within a recess formed in said rotor, which wedge is spring actuated toward a position locking said rotor against rotative movement relative to said casing, and a lever, mounted on said shaft and engaging said wedge, whereby independent rotation of said rotor is restrained and rotation thereof in unison with said driving shaft is tolerated.

2. An improved braking and locking mechanism for the purposes specified comprising, a cylindrical casing having internal teeth or serrations and means for securing it co-axially about a driving shaft, a rotor co-axial with the driving shaft rotatable within said casing, a diametrically recessed embossment on said rotor, shouldered portions formed oppositely on said embossment, spring-actuated detents on opposite sides of said embossment adapted for locking engagement with the casing teeth or serrations, and a lever fixed and having arms projecting on opposite sides of said driving shaft, said lever being adapted upon rotation of said driving shaft in either direction to withdraw said detents from locking engagement with said casing teeth or serrations whereby said rotor can rotate relatively to said casing.

3. An improved braking and locking mechanism for the purposes specified according to claim 2, wherein the detents have wedge parts at their forward ends and wedge surfaces near their rearward ends and wherein the lever arms have wedge members to co-act with the wedge surfaces of said detents, substantially as described.

4. An improved braking and locking mechanism for the purposes specified comprising, a cylindrical casing having internal serrations and means for securing it co-axially about a driving shaft, a rotor co-axially and rotatably mounted within said casing, spring-actuated wedges accommodated within recesses formed in the surface of said rotor and adapted for locking engagement with the casing serrations, a diametral recess in said rotor, corresponding recesses in said wedges, and a lever having oppositely extending arms fixed on the driving shaft and accommodated within the diametral recess of the rotor and the wedge recesses, said lever being adapted upon the rotation of the driving shaft in one direction to withdraw said wedges from the casing serrations to permit unidirectional rotation of said rotor within said casing.

5. An improved braking and locking mechanism for the purposes specified comprising, a cylindrical casing having internal serrations and means for securing it co-axially about a driving shaft, a rotor co-axially and rotatably mounted within said casing, spring-actuated wedges accommodated within recesses formed in the surface of said rotor and adapted for locking engagement with the casing serrations, a diametral recess in said rotor, corresponding recesses in said wedges, and a lever having oppositely extending arms fixed on the driving shaft and accommodated within the diametral recess of the rotor and the wedge recesses, said wedges being so disposed as to engage the arms of said lever, whereby said lever is operative, upon rotative movement of said driving shaft, to release said wedges from said casing teeth, permitting rotation of said rotor relatively to said casing.

LAURENCE FRANCIS MORONEY.